US010029511B2

(12) United States Patent
Walthert et al.

(10) Patent No.: US 10,029,511 B2
(45) Date of Patent: Jul. 24, 2018

(54) WHEEL AND SPOKE, IN PARTICULAR FOR A BICYCLE

(71) Applicant: DT SWISS INC., Grand Junction, CO (US)

(72) Inventors: Martin Walthert, Aarberg (CH); Paul Schuler, München (DE); Adrian Scheidegger, Bolligen (CH); Jean-Paul Victor Ballard, Thalwil (CH)

(73) Assignee: DT SWISS INC., Grand Junction, CO (US)

( * ) Notice: Subject to any disclaimer, the term of this patent is extended or adjusted under 35 U.S.C. 154(b) by 0 days.

(21) Appl. No.: 15/623,009

(22) Filed: Jun. 14, 2017

(65) Prior Publication Data

US 2017/0282638 A1    Oct. 5, 2017

Related U.S. Application Data

(63) Continuation-in-part of application No. 15/061,619, filed on Mar. 4, 2016, now Pat. No. 9,731,546.

(30) Foreign Application Priority Data

Mar. 6, 2015  (DE) .................. 10 2015 103 327
May 10, 2017  (DE) .................. 10 2017 110 161

(51) Int. Cl.
*B60B 1/02*     (2006.01)
*B60B 1/00*     (2006.01)
*B60B 1/04*     (2006.01)

(52) U.S. Cl.
CPC ............ *B60B 1/0246* (2013.01); *B60B 1/003* (2013.01); *B60B 1/041* (2013.01); *B60B 1/042* (2013.01);

(Continued)

(58) Field of Classification Search
CPC ....... B60B 1/0246; B60B 1/048; B60B 1/041; B60B 1/003; B60B 1/042; B60B 2900/1216; B60B 2310/612

(Continued)

(56) References Cited

U.S. PATENT DOCUMENTS 1,560,565 A * 11/1925 Graham .................... B60B 1/00
                                                         29/894.33
3,894,777 A    7/1975 Yamada (Continued)

FOREIGN PATENT DOCUMENTS

DE    8912607 U1    2/1990
DE    8915288 U1    3/1990

(Continued)

OTHER PUBLICATIONS

European Search Report for European Patent Application No. EP 16 15 8821, dated Jun. 6, 2017.

(Continued)

*Primary Examiner* — S. Joseph Morano
*Assistant Examiner* — Jean Charleston
(74) *Attorney, Agent, or Firm* — Greer, Burns & Crain, Ltd.

(57) ABSTRACT

A spoke for an at least partially muscle-powered bicycle and wheel including a spoke where the spoke comprises a spoke body with a hub-side, first end and a rim-side, second end and the first end and the second end are remote from one another. The spoke body is elongated and includes at least one first center region disposed closer to the first end than to the second end, and at least one second center region disposed closer to the second end than to the first end. The first center region and in the second center region of the spoke body each include flattened cross-sections substantially accommodated in a longitudinal plane. In the second (Continued)

center region the spoke body is configured more asymmetric than in the first center region.

18 Claims, 4 Drawing Sheets

(52) U.S. Cl.
CPC ........ *B60B 1/048* (2013.01); *B60B 2310/612* (2013.01); *B60B 2900/1216* (2013.01)

(58) Field of Classification Search
USPC ................................ 301/57, 61, 104, 110.5
See application file for complete search history.

(56) References Cited

U.S. PATENT DOCUMENTS

| | | | |
|---|---|---|---|
| 5,350,221 A | | 9/1994 | Pearce et al. |
| 5,779,323 A | * | 7/1998 | Burrows ............... B60B 1/0246 301/104 |
| 6,189,978 B1 | * | 2/2001 | Lacombe ............. B60B 1/0246 301/104 |
| 7,354,114 B2 | | 4/2008 | Passarotto et al. |
| 9,731,546 B2 | | 8/2017 | Spahr et al. |
| 2004/0174066 A1 | | 9/2004 | Dietrich |
| 2005/0173971 A1 | * | 8/2005 | Passarotto ............... B60B 1/003 301/104 |
| 2008/0129105 A1 | * | 6/2008 | Urbani .................. B60B 1/0246 301/57 |
| 2008/0284237 A1 | | 11/2008 | Tsai |

FOREIGN PATENT DOCUMENTS

| | | |
|---|---|---|
| DE | 29811076 U1 | 10/1998 |
| DE | 202008005903 U1 | 10/2008 |
| DE | 602004012378 T2 | 4/2009 |
| EP | 0794071 A2 | 9/1997 |
| EP | 1559583 A1 | 8/2005 |
| EP | 1923231 A1 | 5/2008 |
| EP | 1930146 A1 | 6/2008 |
| EP | 1955872 B1 | 4/2010 |
| WO | 03/018331 A1 | 3/2003 |

OTHER PUBLICATIONS

German Search Report from corresponding German Patent Application No. 10 2017 110 161.6, dated Feb. 8, 2018.

* cited by examiner

WHEEL AND SPOKE, IN PARTICULAR FOR A BICYCLE

CROSS REFERENCE TO RELATED APPLICATIONS

This application is a continuation-in-part application of U.S. patent application Ser. No. 15/061,619 filed on Mar. 4, 2016, and claims priority to and the benefit of German Application No. 10 2017 110 161.6 filed on May 10, 2017, all of which are incorporated herein by reference in their entireties.

BACKGROUND

The present invention relates to a spoke and a wheel equipped with at least one such spoke and provided in particular for a bicycle or another at least partially muscle-powered two-wheeled vehicle.

Aerodynamics play a significant role for vehicles in general and in particular for at least partially muscle-powered vehicles since as the speed increases, the power required for driving is influenced the strongest by aerodynamic drag. To reduce the aerodynamic drag for bicycles, closed wheels have become known providing largely reduced aerodynamic drag. These closed wheels show the disadvantage that lateral winds cause quite considerable side wind forces which can considerably impair controlling a two-wheeled vehicle. This is why closed disk wheels are as a rule not employed in road bikes.

In the case of spoke wheels the spokes considerably contribute to the aerodynamic drag. The spokes whose standard cross-section is round show less than optimal aerodynamic drag values. Therefore, so-called blade spokes have been disclosed comprising a flat cross-section in the traveling direction, thus contributing to reduced aerodynamic drag.

It is therefore the object of the present invention to provide a wheel equipped with spokes and a spoke which is in particular simple to manufacture for such a wheel so as to allow improved reduction of the aerodynamic drag.

SUMMARY

A wheel according to the invention is provided to be used with an at least partially muscle-powered bicycle and comprises a hub and a rim. The hub is connected with the rim via a plurality of spokes. At least one of the spokes has a spoke body with two ends remote from one another, namely a hub-side, first end and a rim-side, second end.

The first respectively hub-side end is connected with the hub, and the second respectively rim-side end is connected with the rim.

The spoke body is configured elongated and shows at least one first center region disposed closer to the first end than to the second end and at least one second center region disposed closer to the second end than to the first end. Or else many (different) center regions may be provided.

In the first center region and in the second center region of the spoke body the spoke body shows flattened cross sections substantially accommodated in a longitudinal plane. The cross-sections differ from one another.

In the second center region the spoke body configuration is more asymmetric than in the first center region.

In a preferred specific embodiment the wheel spoke which is topmost in an operational condition shows in the second center region a cross-section wherein the longitudinal spoke half oriented forwardly is wider than the longitudinal spoke half oriented rearwardly. This in particular results in a drop shape which is highly streamlined.

A spoke according to the invention comprises a spoke body for a wheel of an at least partially muscle-powered bicycle. The spoke body comprises a hub-side first end and a rim-side second end, the two ends being remote from one another. The spoke body is configured elongated and shows at least one first center region disposed closer to the first end than to the second end and at least one second center region disposed closer to the second end than to the first end.

In the first center region and in the second center region of the spoke body the spoke body shows flattened cross sections substantially accommodated in a longitudinal plane. In the second center region the spoke body configuration is more asymmetric than in the first center region.

The invention has many advantages. The wheel according to the invention and also the spokes according to the invention have many advantages since the spoke allows a markedly reduced aerodynamic drag for a wheel. In the highest speed ranges an optimal shape can be provided. Manufacturing is simple and cost effective.

In operation, speed constellations occur in the spoke radially farther inwardly where an overall drop-shaped spoke may show disadvantages. A spoke which is symmetric in the longitudinal direction (front/rear) shows advantages since it offers better properties in the locally arising negative speeds.

According to the invention the first respectively hub-side end of the spoke body is provided to be connected with the hub and the second respectively rim-side end of the spoke body is provided to be connected with the rim.

The "hub-side end" may also be referred to as "first end" or "first, hub-side end" or "hub-side, first end", and it refers to the end of the spoke body facing the hub where it is, or can be, attached.

The "rim-side end" may also be referred to as "second end" or "second, rim-side end" or "rim-side, second end" and it refers to the spoke body end facing the rim where it is, or can be, attached.

A flattened cross-section in particular means in the sense of the present application that the spoke body shows a thickness (over at least the first and second center regions) transverse to the longitudinal plane which thickness is less than a longitudinal extension of the spoke body in the mounted condition in the peripheral direction of the wheel. Transverse to the longitudinal plane means transverse to the wheel.

In all the configurations it is possible to provide a plurality of succeeding center regions wherein the local cross-section may vary continuously or in steps or quasi-continuously. Thus the spoke body cross-section may be symmetric in the longitudinal and transverse directions radially (nearly entirely) inwardly while radially (nearly entirely) outwardly the cross-section may be (nearly or completely) drop-shaped. The cross-section may vary steplessly and continuously in-between.

In preferred specific embodiments the spoke body shows in the first center region at least one cross-section of a first cross-section type which is configured substantially axially symmetrical relative to a longitudinal extension and to a transverse axis.

The longitudinal extension extends through the largest length and the transverse axis (transverse to the wheel) through the largest thickness of the spoke body.

In the second center region the spoke body preferably has at least one cross-section of a second cross-section type which is configured substantially axially symmetrical with a longitudinal extension and which is on average larger in a first longitudinal half than in the second longitudinal half. In the mounted condition this means in particular that e.g. the topmost spoke in the second center region is configured larger forwardly, toward the tip of the bicycle, than toward the rearward end of the bicycle. In particular, the second cross-section type shows a drop-shaped configuration.

Preferably the first cross-section type is (substantially) elliptical in configuration. This cross-section offers the advantage that both (relative) forward and rearward movements show the same flow resistance which is not the case with a drop shape.

In all the configurations many succeeding center regions may be provided. It is also possible to provide only a few or only two center regions between which a transition region (each) is provided configured with a continuous or stepped transition between (what is) the first and the second (or subsequent) center region.

Preferably (in the case of two center regions) a height of the first center region is between ⅕ and ⅔ of the spoke height (length from the first end to the second end).

Particularly preferably a height of the second center region is between ⅕ and ⅔ of the spoke height.

In all the configurations it is preferred for the surface of the spoke body to be configured smooth. The spoke body surface is preferably polished.

It is possible for at least one center region to show a constant cross-section over its length. It is also possible and preferred for the cross-section to vary over the length of a center region.

Preferably the spoke body has a first end portion at the hub-side, first end and/or a second end portion at the rim-side, second end. The first and/or second end portions are preferably round. The first end portion may be provided with a spoke head. The spoke head may be round but preferably it is flattened. In this way the spoke head may provide anti-twist protection when the flattened spoke head rests against a flat wall. A T-shaped spoke head is possible and preferred.

In all the configurations it is preferred for the flattened cross-section to fit at least substantially (or entirely) into the round cross-section. This means that the largest dimension of the flattened cross-section is larger than the diameter of the round cross-section by not more than 10% or 20%. This configuration is enabled if the flattened cross-sections are inserted into a thinner spoke segment in the center regions if the spoke body is for example shaped tapered in the center regions prior to press-forming for example by mechanical processing or drawing etc. For example, the spoke body may be tapered in the center regions by 20% or 25% or 30% prior to shaping and may be tapered e.g. from 2.0 mm diameter to 1.5 mm diameter.

When one rides on a bicycle the wheel equipped with such a spoke rolls on the ground or the road. The bottommost point of the wheel shows a relative speed of 0 to the surrounding air respectively to the ground. The topmost point of the wheel respectively the topmost point of the topmost spoke, however, is substantially exposed to double the relative speed of the actual driving speed relative to the surrounding air. A configuration of the cross-section for example drop-shaped in the farther outwardly center region, the second center region which is exposed to particularly high circumferential and relative speeds is consequently shaped aerodynamically better than in the prior art so as to achieve a markedly reduced aerodynamic drag in this point.

Concurrently a deterioration is avoided in the center region of the wheel, that is in the first center region which is disposed closer to the hub, since this spot shows local, negative relative speeds perpendicular to the spoke surface. Negative effects are avoided in the case of negative relative speeds. A drop shape is advantageous in one flow direction only. Overall this decreases the aerodynamic drag of a wheel so equipped over a conventional wheel.

In the wheel according to the invention the hub is connected with the hub-side end of each of a plurality of spokes and the rim is connected with the rim-side end of each of the plurality of spokes. This is very advantageous since the flattened and more drop-shaped cross-section in the second center region is disposed radially farther outwardly than is the first center region showing a preferably (somewhat) elliptical cross-section.

Aerodynamic drag increases quadratically with the relative speed between the spoke and the air. The better drop shape on the whole particularly advantageously reduces the aerodynamic drag radially farther outwardly.

A wheel having these spokes is aerodynamic where required and farther inwardly it shows a shape with which relative negative speeds show no adverse effects since the shape is centrosymmetric or point symmetric.

The cross-sectional areas in the center regions are preferably reduced over the cross-sectional areas at the ends. This results in a lower total weight of the spokes and the wheel.

In all the configurations it is particularly preferred for the flattened cross-section of the spoke bodies to be substantially parallel to a plane opened up by the rim. Substantially parallel in the sense of the present invention also includes a certain inclination of e.g. preferably up to 10° or in particular up to 20° or possibly also up to 30° relative to the longitudinal direction. A certain inclination is normal and often desired.

At any rate it is ensured that the center regions with the flattened cross-sections are (substantially) aligned in the running plane, thus reducing and not increasing aerodynamic drag. An increase might occur if the flattened region were aligned completely or substantially transverse to the traveling direction of a bicycle equipped with such a wheel.

In all the configurations it is preferred for the flattened cross-section to be aligned entirely within, or in parallel to, the longitudinal plane. Or else it is possible for the flattened cross-section of the spoke body in the first center region to not entirely extend within the longitudinal plane or in parallel to the longitudinal plane for example where the first center region is slightly curved or very slightly helical. In all the cases the flattened region does not extend transverse to the longitudinal plane but maximally within a region of ±30° and in particular ±20° and preferably ±10° relative to the longitudinal plane. Particularly preferably at least one longitudinal edge of the flattened cross-section is parallel to the longitudinal plane in the range of manufacturing precision of the spoke body.

In a preferred specific embodiment of the wheel or the spoke the spoke body is constant in cross-section over at least a longitudinal section. The longitudinal section is taken from a group of longitudinal sections comprising the first end portion and the second end portion and optionally the first center region and the second center region.

A constant cross-section in the sense of the present invention is understood to mean a substantially constant cross-section. This means that minor cross-section variations of for example less than 10% and in particular less than 5% over the length of the longitudinal section are disregarded and still considered to be a constant cross-section. Cross-section variations over the length of the longitudinal section preferably lie in a dimensional range of less than 5% and in particular less than 2%.

At least one end portion and preferably both the end portions are preferably configured short in the longitudinal direction of the spoke body. Preferably all the end portions are shorter than 30 mm and in particular shorter than 25 mm or 20 mm or 15 mm.

Preferably the length of at least one transition region and preferably of all the transition regions is less than a length of at least one and in particular the shortest end portion.

In all the configurations it is preferred to achieve the flattened cross-sections in the first and second center regions (and further center regions) by way of press-forming. The spoke according to the invention is simple to manufacture. The cross-section may be manufactured in some other way.

In preferred specific embodiments the first end portion and the second end portion show cross-sections similar in configuration. "Cross-sections similar in configuration" in the sense of the present invention is understood to mean that the cross-section shapes are identical in shape while the individual end portions may have different cross-sectional dimensions. Particularly preferably the first end portion and the second end portion have the same cross-sections. In particularly preferred configurations the cross-sections at least of the first end region and the second end region are round and in particular substantially round.

In particularly preferred configurations the spoke is manufactured from a profile section which was originally or substantially configured round wherein the center regions are being tapered in particular by drawing or local hammering and/or cold forging and/or another processing step or machining process so that after the drawing process or machining process two end portions are obtained having larger diameters and for example a homogeneous, reduced-diameter center region.

Thereafter the center can be press-formed so as to produce in this place the center regions showing a flattened cross-section. Consequently, two end portions ensue preferably identical in cross-section and at least one first and at least one second tapered center region having a flattened cross-section. This manufacturing is simple and very cost effective.

Or else it is possible to manufacture the spoke not of an originally round section but of an oval, angular or other cross-sectional profile.

Preferably the flattened cross-section in the second center region shows a cross-sectional shape which is at least approximately wing-shaped with rounded corners. The first center region is preferably oval and/or angular or polygonal and/or elliptic in shape.

In particularly preferred specific embodiments at least one of the two ends of the spoke body has an external thread and/or an externally threaded attachment means for connecting the spoke body to the rim and/or the hub.

Preferably at least one of the two ends of the spoke body is provided with a spoke head for connecting the spoke body via the spoke head with the hub and/or the rim. The spoke head may have a shape that is rotationally symmetric, mirror-symmetric, or point-symmetric or centrosymmetric. The spoke head may for example be configured hemispherical or spherical. A T-shaped configuration of the spoke head is also possible.

The spoke head is in particular T-shaped and/or has a "T head". Such a T-shaped spoke head allows to accommodate the spoke non-rotatably at or in the hub. This ensures a fitting and in particular optimal orientation of the spoke relative to the traveling direction.

Preferably the wheel is equipped with at least one spoke, as has been described above.

On the whole the invention provides an advantageous spoke and an advantageous wheel which allow to achieve a particularly low aerodynamic drag.

BRIEF DESCRIPTION OF THE DRAWINGS

Further advantages and features of the present invention can be taken from the exemplary embodiments which will be described below with reference to the enclosed figures.

The figures show in.

DETAILED DESCRIPTION

Figure 1:
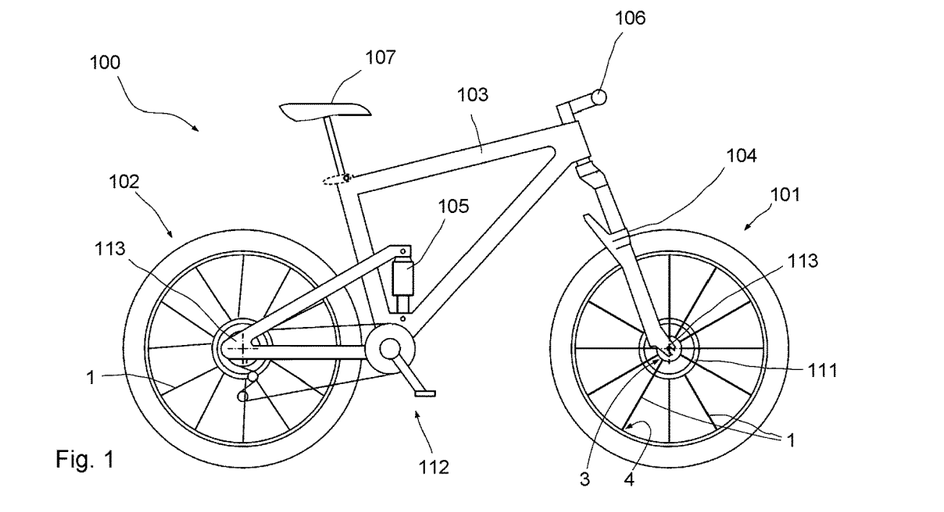
FIG. 1 is a side view of a mountain bike.

FIG. 1 shows a schematic illustration of a mountain bike representing the bicycle or two-wheeled vehicle 100. The bicycle comprises two wheels 101, 102, a front wheel 101 and a rear wheel 102. Furthermore, a frame 103, a suspension fork 104, a rear wheel damper 105, a handlebar 106, and a saddle 107 are provided. The drive 112 is provided by means of pedals and in this case, a derailleur. The front wheel 101 and the rear wheel 102 are each fastened to dropouts 113 on the fork 104 or the frame 103.

Figure 2:
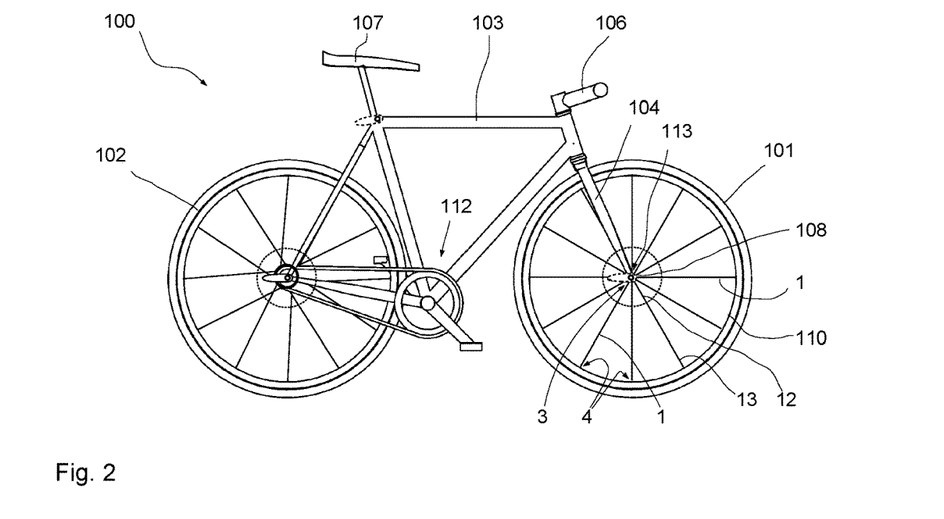
FIG. 2 is a side view of a racing bicycle or a roadster.

FIG. 2 shows a simplistic side view of a racing bicycle or roadster representing the two-wheeled vehicle 100, the bicycle in turn provided with an inventive front wheel 101 and an inventive rear wheel 102 representing the wheels. The wheels are fastened to the dropouts 113. Both the front wheel and the rear wheel 101, 102 comprise a rim 110 and spokes 1 according to the invention. Due to the scale of the drawings the spokes 1 are illustrated schematically only and they will be discussed in depth below with reference to the further figures.

The wheels 101 and 102 in the FIGS. 1 and 2 show a plurality of spokes 1 each. The spokes 1 are connected with the hub 108 by means of the first or hub-side ends 3 and with the rim 110 by means of the second or rim-side ends 4.

Figure 3:
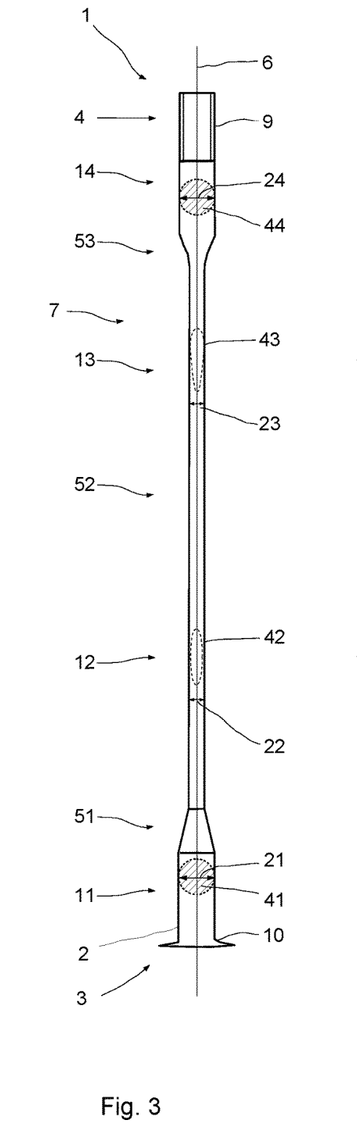
FIG. 3 is a side view of a spoke according to an embodiment of the invention along the longitudinal plane.
Figure 4:
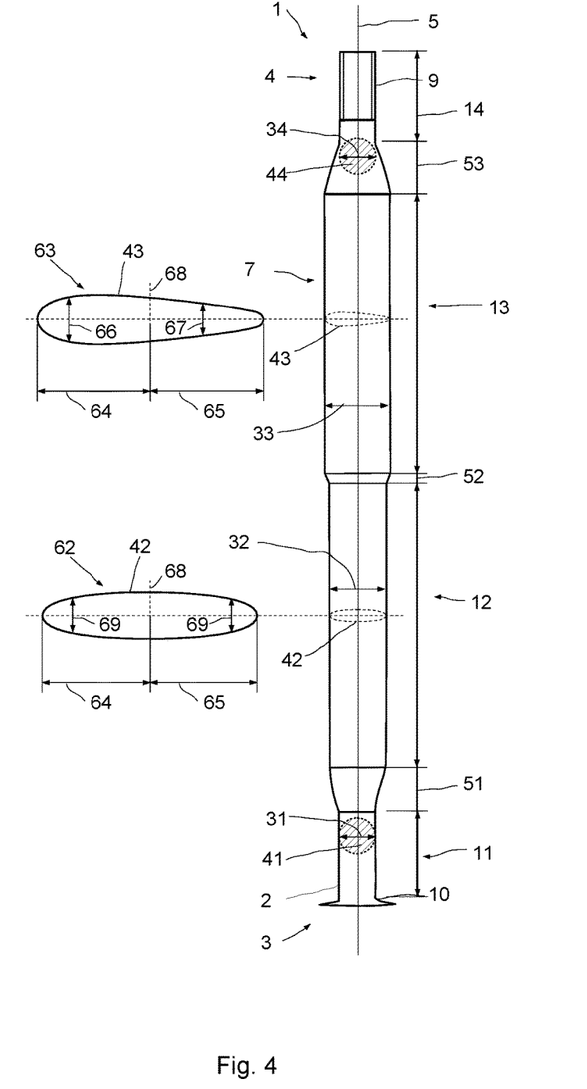
FIG. 4 is a transverse view of the spoke of FIG. 3.

FIGS. 3 and 4 illustrate a spoke 1 of a wheel 101 or 102 according to the invention in a longitudinal view and in a side view.

FIG. 3 shows a schematic view, which is not true to scale in particular in the longitudinal direction 5, of a spoke 1 in the traveling direction. Transverse to the plane of the drawing the longitudinal plane 6 extends, along which a bicycle 100 equipped with such a spoke moves.

The spoke 1 is provided at the hub-side end 3 with a spoke head 10 and at the rim-side end 4 with an external thread 9 which serves for a screw-connection with a spoke nipple not illustrated in FIG. 3.

The first respectively hub-side end 3 of the spoke body 2 is attached to the hub 108 and the spoke body 2 extends outwardly from the hub 108 to the second respectively rim-side end 4 where the external thread 9 is then attached to the rim 110 by means of a spoke nipple (not shown).

The spoke body 2 comprises a first end portion 11 adjacent to the first respectively hub-side end 3, a first center region 12, a second center region 13, and a second end portion 14. A transition region 51 is disposed between the first end portion 11 and the first center region 12. A transition region 53 is disposed between the second center region 13 and the second end portion 14. A transition region 52 may be disposed between the first center region 12 and the second center region 13. Or else a plurality of center regions or a continuous transition is possible.

It is also possible to equip the spoke 1 with attachment means other than spoke heads and threads at the end portions 11 and 14 or to attach the spoke to the hub and the rim by means of other suitable attachment means. Preferably, however, the spoke 1 has a spoke head at the hub-side end and an external thread at the rim-side end.

The first end portion 11 and the second end portion 14 each comprise round cross-sections 41 and 44. These cross-sections 41 and 44 are preferably configured identical. This means that the first end portion thickness 21 in the first end portion 11 substantially coincides with the second end portion thickness 24 at the second end portion 14.

In comparison the first center region thickness 22 at the first center region 12 is markedly thinner. In a concrete example the first end portion thickness 21 is 2.0 mm, and so is the second end portion thickness 24 at the second end portion 14. The first center region thickness 22 in the first center region 12 may, however, only be for example 1.0 or approximately 1.2 mm.

Figure 5:
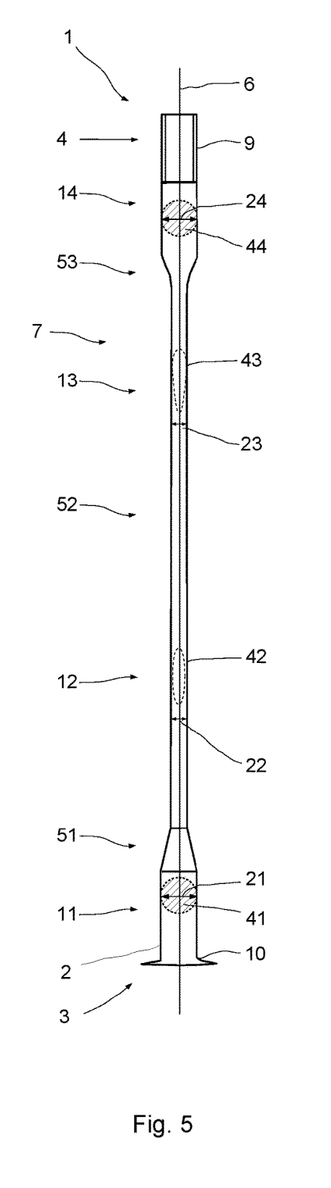
FIG. 5 is a side view of spoke according to another embodiment of the invention along the longitudinal plane.
Figure 6:
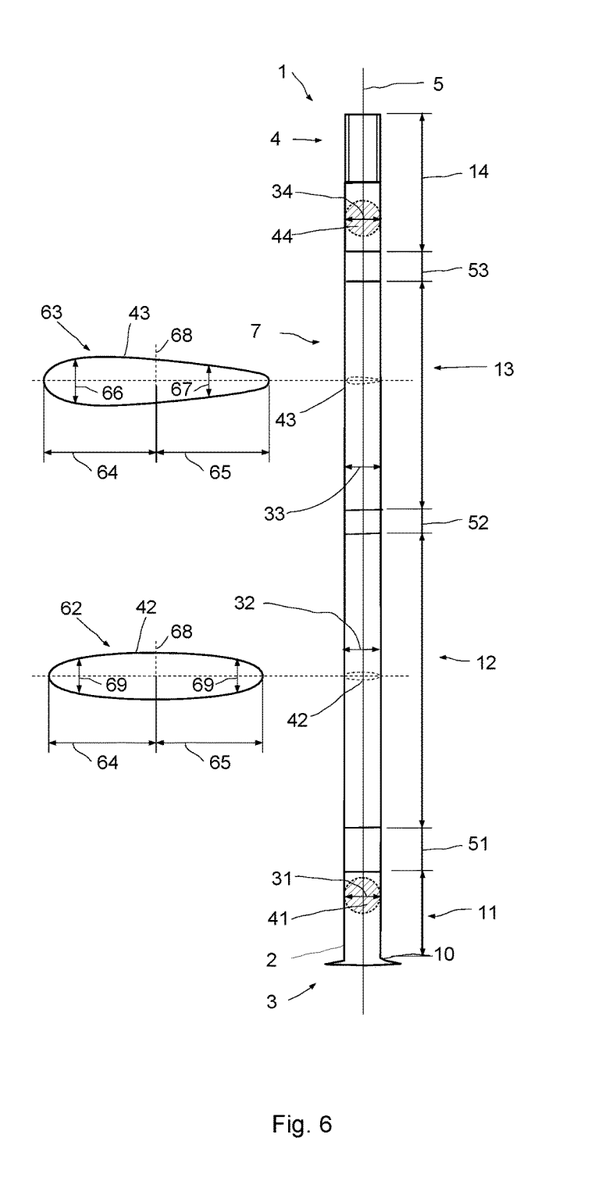
FIG. 6 is a transverse view of the spoke of FIG. 5.

The exemplary embodiment according to FIGS. 5 and 6 substantially corresponds to the exemplary embodiment according to the FIGS. 3 and 4. One difference is that the center regions 12 and 13 were thinned prior to press-forming so that their end portion thicknesses 21 are also 2.0 mm while the center region thicknesses 22 and 23 were reduced to 1.5 mm prior to the final shaping. Therefore, the FIGS. 5 and 6 show center region thicknesses and center region widths which are reduced compared to the exemplary embodiment according to the FIGS. 3 and 4.

In FIGS. 3 and 4 the center region thickness 22 is approximately 1.0 to 1.2 mm and the first and second center regions are approximately 3.2 to approximately 5 mm in width.

In FIGS. 5 and 6 the center region thicknesses 22 and 23 are approximately 0.6 to 0.8 mm and the first and second center regions are approximately 2.8 to approximately 4 mm in width.

In the second center region 13, which is disposed closer to the second end portion 14 than is the first center region 12, the second center region 13 shows a markedly different cross-section 43. The cross-section is approximately drop-shaped in configuration, the thicker end of the drop facing forwardly in the traveling direction.

The first center region 12 closer to the hub shows lower maximum speeds relative to the ambient air. Therefore, the cross-section 42 in the first center region 12 is more symmetric than in the second center region 13. The cross-section 42 is symmetric relative to the longitudinal plane 6 and to the transverse direction 68 so that the spoke end which is front in the traveling direction and the rear spoke end show the same shape.

The second center region 13 lies farther outwardly and at its top end it is exposed to a relative speed between the spoke and the ambient air which is nearly twice the traveling speed. Since the increase of aerodynamic drag of the bicycle is not linear with the relative speed but quadratic, and the required power, cubic, the particularly aerodynamic shaping of the second center region considerably contributes to the reduction of the air drag.

In the radially farther inwardly region the prevailing relative speed (perpendicular!) to the spoke surface may even be less than zero. This is why a drop-shaped configuration is even inconvenient in this place since negative relative speeds also occur which are particularly unfavorable with a drop shape. In this case a symmetric and in particular point-symmetric or centrosymmetric cross-section offers considerable advantages since the aerodynamic drags are equally low both in positive and negative speeds.

The respective cross-sectional shapes in the respective portions or regions are additionally inserted cross-hatched in FIG. 3. It can be clearly seen that the first end portion 11 is substantially round in cross-section 41. The cross-section 44 in the second end portion 14 is also substantially round.

Unlike thereto, the cross-sections 42 and 43 in the first and second center regions 12, 13 are configured flattened, as can be taken from the cross-sections 42 and 43 inserted in broken lines.

FIG. 4 shows a schematic side view of the spoke 1 from FIG. 3, showing a substantially identical view due to the round end portions 11 and 14.

The views of the first and second center regions 12 and 13, where the flattened cross-sections 42, 43 of the first and second center regions 12, 13 are shown from the side, are considerably different. While due to the round configurations in the first end portion 11 the first end portion thickness 21 corresponds to the first end portion width 31 and in the second end portion 14 the second end portion thickness 24 corresponds to the second end portion width 34, the (first) second center region width (32) 33 does considerably differ from the (first) second center region thickness (22) 23. In the exemplary embodiment the center region widths 32, 33 are up to 5 mm and thus they may be more than twice the first or second center region thickness 22, 23 which is approximately 1 to 1.2 mm.

The transition regions 51, 53 show gradual transitions between the respective portions or regions.

In the longitudinal direction 5 of the spoke body 2 the transition regions 51 and 53 are considerably shorter than the center regions 12 and 13 and presently they are shorter than the end portions 11 and 14.

When two separated center regions 12 and 13 are configured, a transition region 52 may be provided in-between having a length of e.g. 5 mm to 10 mm. A continuous transition is likewise preferred.

A continuous transition from the beginning of the first center region 12 up to the end of the second center region 13 is also possible and preferred. The cross-section may be continuously approximating from a drop shape to an elliptical shape.

In the first center region 12 the spoke body 2 of the spoke 1 shows at least a cross-section 42 of a first cross-section type 62. The first cross-section type 62 is configured (substantially) axially symmetrical with a longitudinal extension and a transverse axis 68. Preferably the first cross-section type 62 has a shape that is (substantially) point symmetric. The first cross-section type 72 is preferably substantially or entirely elliptic. The first cross-section type 62 shows in a first longitudinal half 64 a typical or average thickness 69 which preferably equals a typical or average thickness 69 in the second longitudinal half 65.

In the second center region 13 the spoke body 2 of the spoke 1 shows at least a cross-section 43 of a second cross-section type 63. The second cross-section type 63 is configured (substantially) axially symmetrical with a longitudinal extension. In a first longitudinal half 64 the second cross-section type 63 is on average (average thickness 66) thicker than in the second longitudinal half 65 showing an average thickness 67. The maximum thickness in the first longitudinal half 64 is also larger than in the second longitudinal half 65. The second cross-section type 73 is substantially or entirely configured drop-shaped.

FIG. 5 shows a longitudinal view and FIG. 6 shows a side view of another spoke 1 manufactured from a starting material whose center thickness was first reduced. The length 15 of the second center region 13 with the flattened and approximately drop-shaped cross-section 43 preferably shows between about ⅔ and about ⅓ of the length 8 of a spoke body 2. In a concrete exemplary embodiment, the second center region 15 is somewhat more than half in length of the entire spoke body 2. The configuration is basically the same as in the FIGS. 3 and 4.

A length 8 of the entire spoke 1, i.e. from end portion 11 to end portion 14, depends on the application and the installed situation. In a concrete case the length 8 of the spoke body is 290 mm although it may be shorter or longer by e.g. up to 10% or 20%, depending on the rim and installation position etc.

The cross-section 41 from the first end portion 11 is also inserted in the Figures in a broken line. A body is manufactured by machining or e.g. by drawing from the body which was originally homogeneous in the longitudinal direction, the body is reduced in cross-section in the center regions 12 and 13 while the original diameter is maintained in the first end portion 11 and the second end portion 14. Thereafter the spoke body 2 is press-formed in the first and second center regions 12, 13 so as to achieve the flattened cross-sections 42, 43.

Figures 7, 8:
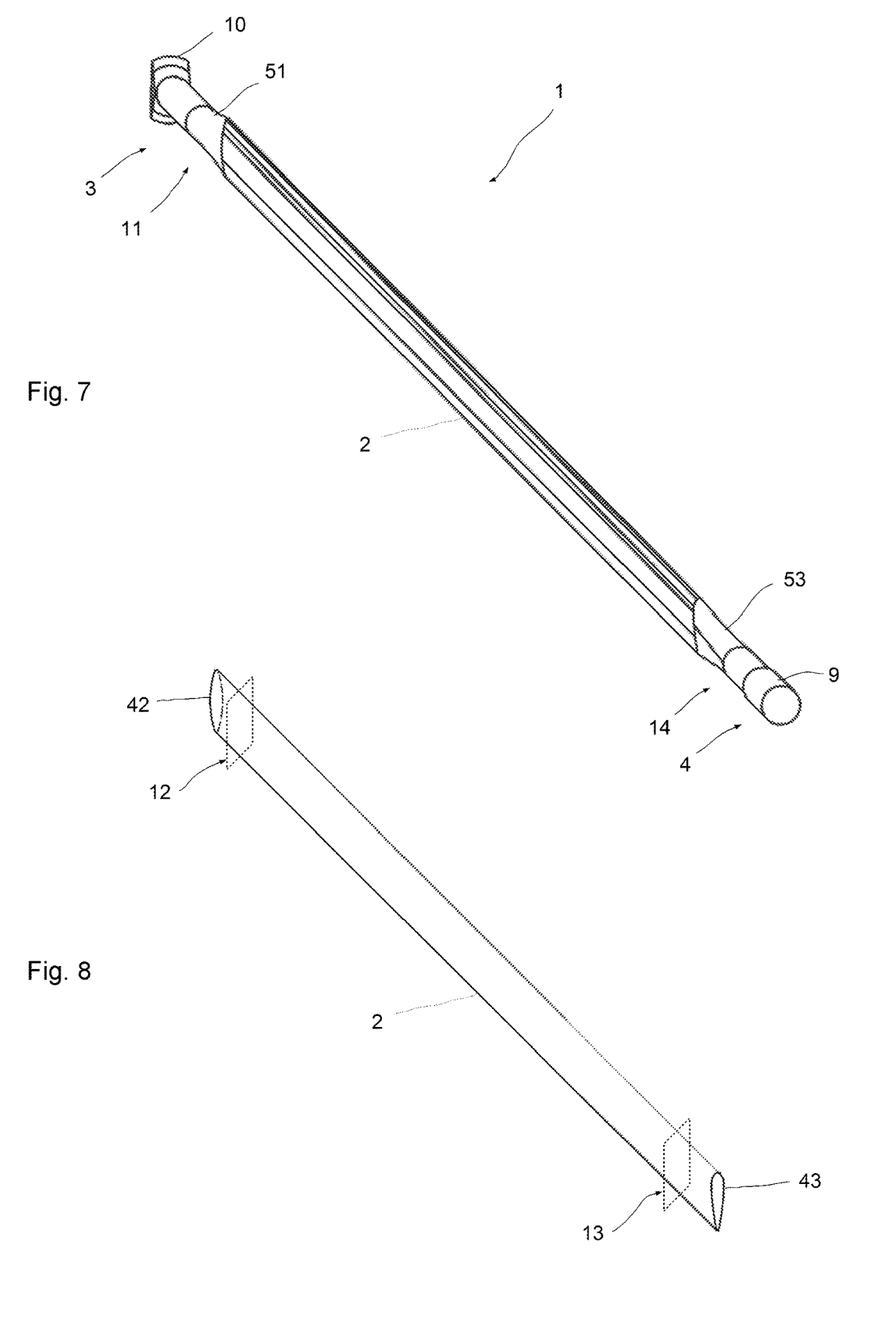
FIG. 7 is a perspective view of a spoke according to a further embodiment of the invention.
FIG. 8 is a perspective view of the central region of the spoke of FIG. 7.

FIGS. 7 and 8 show an isometric illustration of another exemplary embodiment of an inventive spoke 1. The FIG. 7 shows the entire spoke including the end 3 with the T-shaped spoke head and the end 4 with the spoke thread, not shown in detail. Other connection options are also possible at the hub-side or first end 3 and the rim-side or second end 4.

The spoke 1 in FIGS. 7 and 8 basically shows the same architecture as does a spoke of the other exemplary embodiments. The spoke also shows end portions 11 and 14 which preferably show a round cross-section at least in part. The spoke head 10 is preferably flattened in configuration to provide anti-twist protection.

FIG. 8 illustrates the central section between the end portions 11 and 14 separately. In the central portion the cross-sectional shape changes continuously from the drop-shaped cross section 43 at the end of the rim-side region 13 up to the elliptic cross section 42 at the hub-side end of the region 12. The cross sectional shape shows continuous or at least quasi-continuous changes between the illustrated cross sections 12 and 13. In this exemplary embodiment and also in the other exemplary embodiments the cross-sectional area of the spoke body remains preferably constant in the center regions. This facilitates manufacturing from metal by press-forming.

The spoke 1 is preferably provided with transition regions 51 and 53 in which the cross sections concerned make a transition from the elliptic or drop-shaped cross-sectional shape to a round cross-sectional shape. Unlike other configurations the exemplary embodiment according to the FIGS. 7 and 8 at any rate does not show a visible transition region 53 since the center regions 12 and 13 make a continuous transition to one another.

On the whole the invention offers considerable advantages. While the drag coefficients of cross-sectional shapes such as circle and ellipse are identical for air approaching from the right and left, the side of air approach is decisive for the streamline shape. The power requirement of a body for overcoming a flow resistance is overproportionately dependent on the speed. The resistance which the rider must overcome during a ride is composed of a number of components. In higher speeds the major portion is owed to the air drag which in turn is combined from a rotational with a translational portion.

The movement of the rider and the non-rotating parts of the bicycle is only a displacement in the traveling direction. The movement of the wheels is a combination of rotation and translation. Thus, the wheels are exposed to two forms of air drag, the translational and the rotational air drag.

The rotational air drag arises from the eddy-making or pressure resistance forces at the spokes, and from friction forces on the surfaces of the tire, rim, spokes, and hub. The product of these forces with their distance from the rotation axis of the wheel provides a moment of resistance which decelerates the wheel rotation. The surface friction on the rim as part of the rotational air drag acts similar to a slight brake drag.

The speed of a point on the wheel is dependent on its distance from the wheel and on the angular speed of the wheel.

For the instantaneous pole per se the distance is zero. Consequently, its speed is also zero. The speed at the topmost point of the wheel is—since this point lies at twice the distance from the instantaneous pole compared to the hub axle—twice the traveling speed. The speed curve between the topmost and the bottommost points of the wheel is proportionate to the distance from the instantaneous pole—i.e. linear.

Now in the next step when considering any random points on the spokes lying between the horizontal and vertical spokes, the following fact is striking: when the side toward which the top vertical spoke moves, is defined as the front ("V"), then the observed spoke in the top wheel half likewise moves in the direction of its front face, while the speed in a region of the lower wheel half faces the direction of its rear edge.

This is the result: Depending on the current location of the spoke, it moves in the direction toward its front or rear face.

Or, in other words: The lower half of the wheel shows a region in which the direction of movement of the spoke reverses.

Since a wheel rotates continuously, each spoke position must be regarded as equally significant. The speed curve for each point on the spoke corresponds to a sinusoidal function. The highest speed occurs for each point on the spoke as the spoke is in the top vertical position (0°), the highest negative speed, as the spoke is in the bottom vertical position (180°). Since the speed depends on the distance from the instantaneous pole, the maximum positive and negative speeds differ in different points on the spoke. A point at the spoke end near the rim has a large distance from the instantaneous pole when the spoke is in the top vertical position—thus the speed is very high. Regarding the bottom vertical spoke will show that this point only has a small distance namely, the height of the tire and the rim. Therefore, the speed is very low. A point at the spoke end near the hub shows the other extreme: its distance from the pivot point only varies slightly since it rotates around the hub in a considerably smaller circle. The maximum positive and negative speeds therefore show a similar magnitude.

For symmetric bodies the resistance is not dependent on whether air approaches the body from the right or the left. In a body which is symmetrical in one direction only, the direction of air approach does make a difference.

In the vicinity of the hub the positive and negative speeds occurring are similar. Thus, the profile ought to be similarly streamlined from both sides. Near the rim the highest positive speed is higher than the highest negative speed by a multiple factor. Therefore, an improvement of the shape for a positive air approach provides an advantage overall. Since the speed enters into the aerodynamic input power raised to the power of three, the streamlining property must be considered to be considerably more significant in the direction of positive speed than in the direction of negative speed.

In the region of the hub the positive and negative speeds are comparable. It is thus advantageous for aerodynamics of the spoke cross-section to work about the same in both directions. In the region of the rim, however, the highest positive speed is considerably higher than the highest negative speed. It is considerably useful for the one direction to improve in aerodynamic terms—even if the other direction turns worse.

It ensues that the highest negative speeds occur for points in the vicinity of the hub. These show—considering the range of negative speeds only—the largest distance from the instantaneous pole.

As is the case for everybody, spokes also provide for the flow resistance to be divided up in pressure drag and friction drag. The latter is decisively dependent on the size of the surface and the roughness of the spoke surface.

It is advantageous for the spoke profile near the hub to show similar aerodynamics for positive and negative speeds. For this reason, this spoke end is preferably provided with a symmetrical cross-section.

The spoke end facing the rim usefully shows a cross-sectional shape optimized for positive air approach. For this reason, a single-axis symmetric profile is selected in this case. The finding of the form may be based on an NACA aeroprofile.

Since the speed curve (perpendicular to the spoke) is linear between the two spoke ends, a linear cross-sectional shape curve is preferably selected. The cross-section shows linear changes between the end portions.

A spoke having a spoke body showing a double-axis symmetric profile near the hub and a single-axis symmetric profile near the rim is advantageous. A linear transition between the profiles at the two spoke ends is preferred. The cross-sectional area over the curve of the spoke is (at least in the center) preferably constant.

LIST OF REFERENCE NUMERALS

1 spoke
2 spoke body
3 hub-side, first end
4 rim-side, second end
5 longitudinal direction
6 longitudinal plane
7 longitudinal section
8 length of 2
9 screw thread
10 spoke head
11 first end portion
12 first center region
13 second center region
14 second end portion
15 length of 13
21 first end portion thickness
22 first center region thickness
23 second center region thickness
24 second end portion thickness
31 first end portion width
32 first center region width
33 second center region width
34 second end portion width
41 cross-section
42 cross-section
43 cross-section
44 cross-section
51 transition region
52 transition region
53 transition region
62 cross-section type
63 cross-section type
64 first longitudinal half
65 second longitudinal half
66 first thickness
67 second thickness
68 transverse axis
69 thickness
100 two-wheeled vehicle, bicycle
101 wheel, front wheel
102 wheel, rear wheel
103 frame
104 fork
105 damper
106 handlebar
107 saddle
108 hub
109 spoke
110 rim
111 brake disk
112 drive
113 dropout

The invention claimed is:

1. A spoke comprising a spoke body for a wheel of an at least partially muscle-powered bicycle, comprising:
    the spoke body comprises a hub-side, first end and a rim-side, second end, wherein the two ends are remote from one another; and
    the spoke body is configured elongated and comprises at least one first center region disposed closer to the first end than to the second end, and at least one second center region disposed closer to the second end than to the first end,
    wherein the first center region and the second center region of the spoke body, each comprise a flattened cross-section which is substantially accommodated in a longitudinal plane, and wherein the cross-section of the second center region is more asymmetric than the cross-section of the first center region.

2. The spoke according claim 1, wherein the spoke body comprises in the first center region, a cross-section of a first cross-section type which is configured substantially axially symmetrical relative to a longitudinal extension and a transverse axis.

3. The spoke according to claim 1, wherein the spoke body comprises in the second center region, a cross-section of a second cross-section type which is configured substantially axially symmetrical to a longitudinal extension and which in a first longitudinal half is on average thicker than in the second longitudinal half.

4. The spoke according to claim 1, wherein the second cross-section type is configured drop-shaped.

5. The spoke according to claim 1, wherein the first cross-section type is configured elliptical.

6. The spoke according to claim 1, wherein a transition region is configured with a continuous or stepped transition between the first and the second center regions.

7. The spoke according to claim 1, wherein a plurality of center regions transitioning to one another is configured.

8. The spoke according to claim 1, wherein a height of the first center region is between one-fifth and two-thirds of the spoke height.

9. The spoke according to claim 1, wherein a height of the second center region is between one-fifth and two-thirds of the spoke height.

10. The spoke according to claim 1, wherein a surface of the spoke body is polished.

11. The spoke according to claim 1, wherein the cross-section is constant over at least one center region.

12. The spoke according to claim 1, wherein the spoke body has a first end portion at the hub-side, first end and a second end portion at the rim-side, second end.

13. The spoke according to claim 12, wherein at least one of the end portions is a round in cross-section.

14. The spoke according to claim 13, wherein the flattened cross-section fits into the round cross-section.

15. The spoke according to claim 1, wherein the spoke body comprises an external thread at the second end and a spoke head at the first end.

16. The spoke according to claim 15, wherein the spoke head is T-shaped.

17. A wheel of an at least partially muscle-powered bicycle, comprising:

a hub and a rim, wherein the hub is connected with the rim through a plurality of spokes, at least one of the spokes including a spoke body having two ends remote from one another, namely a hub-side, first end and a rim-side, second end, wherein the hub-side end is connected with the hub and the rim-side end is connected with the rim, the spoke body is elongated and comprises at least one first center region disposed closer to the first end than to the second end and at least one second center region disposed closer to the second end than to the first end, wherein the first center region and in the second center region of the spoke body, each comprise a flattened cross-section which is substantially accommodated in a longitudinal plane, and wherein the cross-section of the second center region is more asymmetric than the cross-section of the first center region.

18. The wheel according to claim 17, wherein the spoke which is topmost in an operational condition shows in the second center region a cross-section wherein the longitudinal spoke half oriented forwardly is wider than the longitudinal spoke half oriented rearwardly.

* * * * *